April 18, 1950     E. V. BARKER     2,504,623
PAWL AND RATCHET TRANSMISSION MECHANISM
Filed Feb. 27, 1948
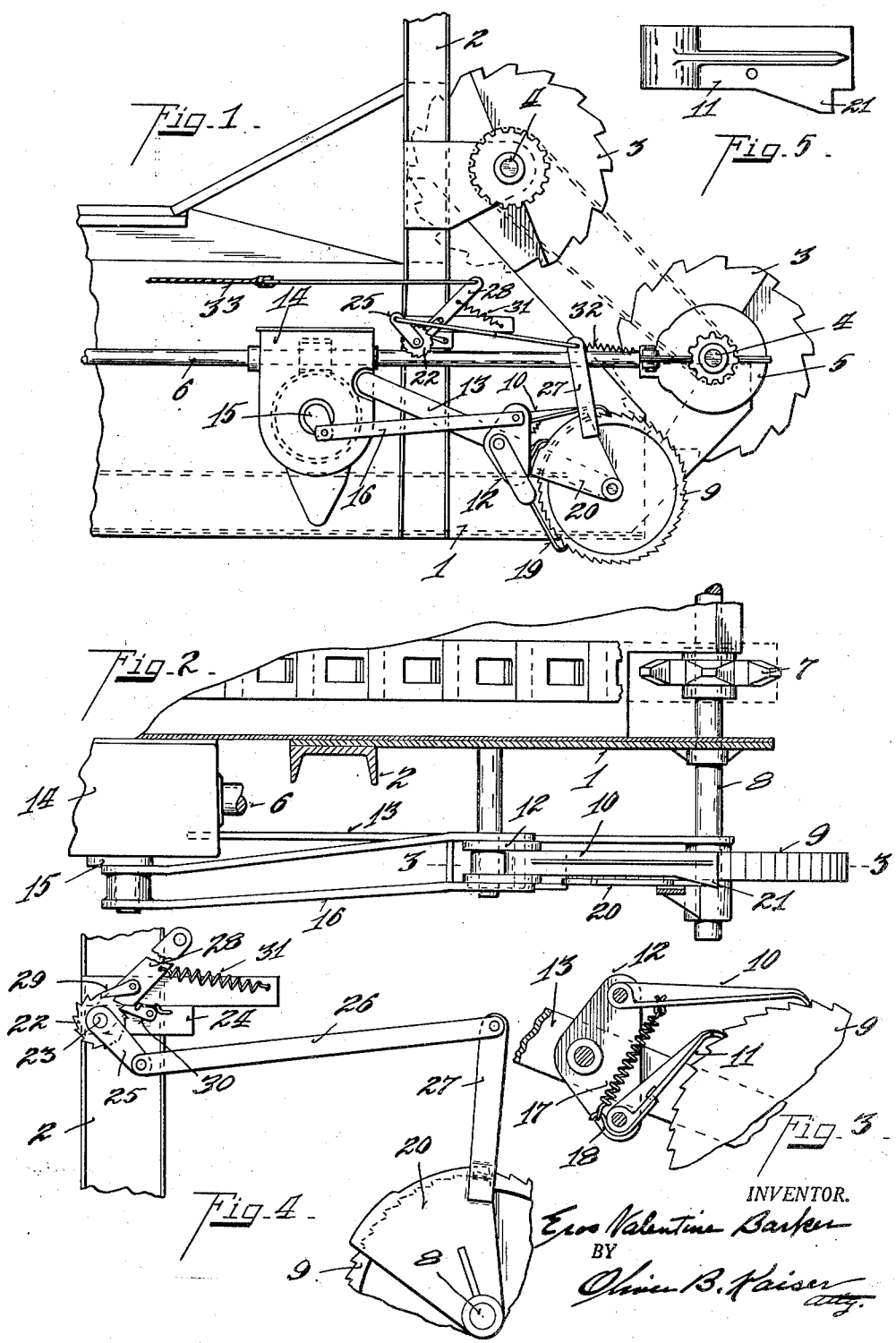
INVENTOR.
Eros Valentine Barker
BY
Oliver B. Kaiser Patented Apr. 18, 1950

2,504,623

UNITED STATES PATENT OFFICE 2,504,623

PAWL AND RATCHET TRANSMISSION MECHANISM

Eros Valentine Barker, Galion, Ohio, assignor to The Perfection Steel Body Company, Galion, Ohio, a corporation of Ohio Application February 27, 1948, Serial No. 11,627

3 Claims. (Cl. 74—156)

This invention relates to transmission mechanism or a pawl and ratchet gear controllable for imparting either approximately continuous or intermittent rotation, with the intermittent impelling degree variable or to neutralize its impellment and the control capable of being manually operated from a remote point by forward strokes or pull movements of a rod or cable.

The transmission primarily is combined with and is adapted for driving or propelling an endless conveyor installed within the body of a vehicle. The conveyor serving to advance the material for unloading the same from the vehicle body, or other services in the embodiment exemplified, the endless conveyor traveling upon and about the floor of the vehicle body, feedingly advances a commodity as fertilizer material into action with one or more rotative rolls, extending cross-wise of the discharge end of the vehicle body, the rolls being of a character to disintegrate and forcibly disperse the fertilizer material therefrom. Continuous or intermittent advance of the fertilizer material relatively produces different distribution results.

Therefore an object of the invention is to provide a transmission mechanism adaptable for imparting selectively either continuous or intermittent rotation, with the extent or degree of intermittency variable, as a drive, as an example, for an endless conveyor for translating material to be operated upon and wherewith the feeding advance of the conveyor can be varied and controlled.

Another object is to provide a pawl and ratchet gear with a pair of relatively alternately movable pawls successively cooperating with the ratchet wheel for its continuous rotation and which can be rendered intermittent or neutralized by guiding the pawls to move in relief of the ratchet wheel for a period or the full length of their impelling stroke movements.

Another object is to provide a pawl and ratchet gear controllable for imparting either continuous or intermittent rotation and to neutralize its transmissibility with the control means operable from a remote point by stroke movements.

Another object is to provide transmission means for either continuously or intermittently operating an endless conveyor for advancing the material carried by and within a vehicle body or the like for discharge therefrom and whereby the degree of intermittent advance can be varied, or the advance neutralized and the control adaptable for manual operation from a remote point.

Another object is to provide a transmission of the pawl and ratchet gear type readily controllable for continuously or intermittently driving an endless conveyor installed within the body of a vehicle, the conveyor moving upon and about the floor of the vehicle body to feedingly advance material carried within the vehicle body for treatment or discharge therefrom.

Various other features and advantages of the invention are more fully set forth in and apparent from the following description of the preferred embodiment as illustrated by the drawings accompanied herewith and forming a part of this specification, in which:

Figure 1 is a side elevation of a side of the rear end of a vehicle containing the improved transmission mechanism for intermittently translating an endless conveyor located along and moving about the base of the body and vehicle.

Figure 2 is an enlarged top plan view of the transmission mechanism as applied on the outerside of a side wall of a vehicle body, showing a section of the base of the body and section of the conveyor driving shaft with a sprocket wheel for a conveyor chain fixed thereon.

Figure 3 is a section on line 3—3, Figure 2.

Figure 4 is an enlarged side elevation of the pawl controlling cam of the transmission mechanism and regulating means therefor adapted to be remotely operated.

Figure 5 is a plan view of one of the pawls of the transmission mechanism.

As a use of the transmission, as heretofore emphasized, being for a vehicle for transporting and distributing a commodity such as fertilizer material to effect and control its discharge therefrom, and particularly as a drive for means, as a conveyor, within the vehicle body to advance the material, and whereby the advance is governed and controlled for bringing the material for action thereon by one or more rotating rolls of a character to disintegrate and forcibly dispense the same, as made the subject matter of a separate application, filed November 15, 1947, Serial Number 786,257, it will be exemplified as to its structure and mode of operation for such use.

The vehicle as disclosed in said application is of a trailer type adapted to be coupled to and transported by a tractor and which also provides the driving power for the conveyor transmission mechanism and fertilizer disintegrating and distributing rolls and as the structure and type of vehicle is separate and apart hereof no disclosure thereof is made herein except as to the end of one side of the body of the vehicle to which the transmission mechanism for the conveyor is applied. This also follows, as to the detail of construction of the endless conveyor and method of its application within the vehicle body. In accordance with such method of transporting the vehicle and providing the driving power for the conveyor transmission mechanism it is desirable that its control be remote of the vehicle, and accessible to the driver of the tractor, so that for his convenience he is not required to make stops and leave his position for control of the transmission mechanism.

Referring to the drawings 1 indicates a section of the rear end of a vehicle body, as of sheet metal construction, with the conveyor transmission mechanism on the outer side of a side wall thereof and the means for actuating the control mounted upon a perpendicular frame 2, spanning and connecting the opposite side walls of the body to stabilize the same at their rear end, as the rear end of the body is open.

An endless conveyor traverses longitudinally about the floor or base of the body and in its course for the forward run or span travels upon the body floor for feedingly conveying the material within the vehicle body toward the discharge end for unloading or to a pair of relatively superposed and staggeredly arranged rotative material disintegrating and distributing rolls 3, 3, of duplicate construction. The rolls extend crosswise of and for the full width of the vehicle body, with the lower roll immediately above and at the discharge end of the conveyor. Each roll is composed of a plurality of spiral peripherally toothed or serrated vanes and the axles or shafts 4, 4, of the rolls are transmittingly connected by a sprocket chain engaged about a sprocket wheel respectively fixed upon the end of each of the shafts. The shaft 4 for the lower roll is in driven connection with gearing, as bevel gears housed and journalled within a casing 5, and in driven connection with a shaft 6, extending longitudinally of the vehicle body which at the forward end of the vehicle is adapted for a coupling connection with transmission means of a tractor.

The conveyor, a section thereof being shown in Figure 2 preferably may comprise a plurality of endless sprocket chains connected by angle iron cross-rods determinately spaced. The sprocket chains, each at the delivery end of the conveyor engage about a respective sprocket wheel 7, fixed upon a driven shaft 8 extending cross-wise of the vehicle body and journalled in bearings carried by the opposite longitudinal sides of the vehicle body. The shaft 8 at one end extends beyond the relative side wall of the vehicle body and has a ratchet wheel 9, as an element of the conveyor transmission mechanism, fixed thereon. The ratchet wheel is either continuously or intermittently rotated by a pair of superposed pawls 10 and 11 of relatively different length, each at its forward end toothed for engagement with the teeth on the periphery of the ratchet wheel to rotatively advance the same in each forward stroke of the pawls unless adjusted not to contact therewith. Each pawl at its supported end is pivotally mounted upon a respective end of a rocker lever 12 at one side of the axis of said lever. The rocker lever 12 is pivotally mounted upon a tie link 13, as a stationary support which at one end is loosely supported upon the conveyor shaft and at its opposite end is rigidly mounted upon a transmission casing 14 sustained upon the exterior side of a side wall of the vehicle body.

The rocker lever 12 is oscillated by a crank shaft 15 journalled in the transmission casing 14 and has its crank arm exterior of the casing and connected by a link 16 with one arm or end of the rocker lever 12. The crank shaft 15 within the casing 14 has a worm wheel fixed thereon in mesh with a worm fixed upon the shaft 6 which provides the driving power for the conveyor to move the load toward the discharge end of the body for unloading or against disintegrating and distributing rolls 3, 3.

The pawls 10 and 11 connecting with the rocker lever 12 at relative opposite sides of its axis are alternately and successively effective in a forward stroke to intermittently actuate the wheel 9 when engaged with the teeth thereof. The pawls are yieldingly urged into contact engagement with the toothed periphery of the ratchet wheel 9 by a spring 17, having one end connected to the upper pawl 10 and its opposite end to a clip 18 fixed to the lower or second pawl 11. Reverse rotation of the ratchet wheel 9 is locked or withheld by a latching pawl 19 pivotally mounted upon the shaft which sustains the rocker lever 12.

The rotative impulse of the ratchet wheel administered by each of the pawls is varied or regulated from the maximum length of pawl stroke or thrust imparted by the rocker lever 12, by a cam plate 20, pivotally mounted upon the conveyor shaft 8 immediately alongside of the ratchet wheel 9 which limits and governs the activity of the pawls for engagement with the teeth of the ratchet wheel 12 in their stroke movements. Each pawl has a lip 21 projecting laterally from its tooth end to engage and traverse upon the controlling edge of the cam plate 20, which when engaged thereupon elevates the pawl from or sustains the same in relief of the ratchet wheel for a determined length of reciprocation, forward and reverse, or to maintain the same from actuating the ratchet wheel for its full length of stroke to arrest rotation of the ratchet wheel. For example, assume that the length of throw of the crank arm of the shaft 14, or the oscillating stroke of the rocker lever 12 is equal to the combined spacing of four consecutive teeth of the ratchet wheel 9 and that the cam plate 20 is adjusted to be ineffective to elevate the pawls for non-engagement with the ratchet wheel the maximum degree of rotating motion is then maintained for each forward stroke of the pawls in a successive order, as the pawls are moved in relative reverse directions, one moving forward while the second recedes approximately continuous rotation of the ratchet wheel is instituted. Shifting the cam plate forward, the effectiveness of the pawls to actuate the ratchet wheel for the maximum length of their strokes can be shortened for intermittent rotation of the ratchet wheel or rendered completely ineffective to arrest ratchet wheel motion. The lower pawl 11, as shown in Figure 5 has its lip 21 retracted from its forward tooth end so as not to be controlled by the portion of the cam for controlling the upper pawl, the control of the pawls thereby being relatively independent.

The position of the cam plate 20, is controlled and regulated by a ratchet device mounted on the side of the vehicle body appropriately to the transmission mechanism and which will permit it to be operated at a point remote from the vehicle, as from a driver's seat of a tractor.

The ratchet device comprises a ratchet wheel 22, fixed to a shaft 23 carried and journalled by a plate 24, secured to the frame 2 of the vehicle body. A crank arm 25 is fixed to the outer end of shaft 23. The crank arm 25 at its outer end pivotally connects to one end of a connecting link 26 and the opposite end of the link pivotally connects to the end of an arm 27, fixed to and radially extending from the cam plate 20. The ratchet wheel 22 is intermittently rotated by a lever 28 having one end pivotally mounted upon the shaft 23, which sustains and journals the ratchet wheel 22. The lever 28 pivotally carries a pawl 29 having its toothed end in engagement with the toothed periphery of the ratchet wheel to rotate the ratchet wheel in step degrees with each forward stroke of the lever 28. A spring tensioned locking pawl 30 pivotally mounted upon the plate 24 engages with the toothed periphery of the ratchet wheel 22 to resist reverse rotation thereof.

The lever 28 connects with an end of a spring 31 for automatically retracting the lever. The arm 27 of the cam plate 20 is maintained under tension by a spring 32, having one end fixed to the arm and the other end to a rigid support, as to the transmission casing 5.

The spring 32 provides for automatically moving the crank arm for a portion of its rotative cycle to quickly shift the cam 20 from the limit of its active position back to a neutral or starting position. This materially reduces the number of strokes of the lever 28 to adjust the cam to govern and control the pawls for intermittent transmission of the conveyor or to neutralize the same. Upon several strokes of the lever 28 the crank will be moved beyond what may be termed a dead central position whereupon the retreating force of the spring 32 will automatically move the crank arm and the cam in connection therewith to a neutral or starting position, ready to repeat the cycle upon several successive forward strokes of the pawl carrying lever 28.

A pull cord 33 is attached to the free end of the lever 28 and extends therefrom forward of the vehicle body as for convenient accessibility by the driver of a tractor to which the vehicle is coupled. Thus with several forward strokes of lever 28 a complete rotative cycle of the ratchet wheel 22 and its crank arm 27 can be effected, thereby relatively shifting the cam plate 20, in successive alternate directions for regulating and governing the cooperation of the pawls 10 and 11 with the conveyor transmission ratchet wheel 9 thereby regulating and governing the translation of the conveyor.

The conveyor extends approximately the full length of the base of the body, so that the entire charge, such as manure, carried by the body is translated toward the distributor rolls 3, 3, to be progressively acted and distributed upon the soil over which the vehicle is transported and by controlling the rate of conveyor motion the quantity distribution can be regulated or arrested, with the rolls rotating at a constant rate of speed.

Shifting the cam 20 to a position at which it is ineffective to move the pawls 10 and 11 in relief of their engagement with the ratchet wheel 9 and as the reciprocation of the pawls is constant through their connection with the lever 12, which in turn is in connection with the continuously rotating crank 15, and transmission in connection with the shaft 6, the ratchet wheel 9 is continuously rotated. Moving the cam 20, to set the same to an extreme opposite position, the pawls are sustained in relief of the ratchet wheel 9 for their entire stroke thereby arresting the motion of the ratchet wheel 9, neutralizing the movement of the conveyor. In shifting the cam 20 to an intermediate position the pawls are sustained in relief of the ratchet wheel 9 for a portion of their active stroke, resulting in intermittently rotating the ratchet wheel 9. The intermittent action can be varied according to the number of teeth contained within the length of the pawl stroke. For example assume that the tooth spacing of the ratchet wheel is such as to embody three teeth within the full length of pawl stroke the cam can be set so that the pawl will successively engage each tooth or omit one or more.

The cam being in connection with the crank 25 rotatively actuated by a pawl and ratchet gear it is adjusted in step degrees in both forward and reverse directions for the adjusting range and administered by forward pulling strokes or movement of the pawl carrying lever 28. Therefore with several forward strokes of the lever 28 it is possible to readily move the crank arm 25 for a complete cycle or to an adjusted position for the desired control of the conveyor transmission.

Having described my invention, I claim:

1. A pawl and ratchet gear transmission, comprising a driven shaft, a power driven pawl and ratchet wheel gear for driving said shaft, a cam in relation to the toothed periphery of the ratchet wheel regulatable for pawl movement and sustention in relief of the toothed periphery of the ratchet wheel for a portion and a full ratchet wheel engaging stroke to vary the intermittent rotation of the ratchet wheel and to neutralize the same and a manually operable pawl and ratchet wheel gear having a rotative crank in coupling connection with said cam to shift the same in alternate directions for pawl ratchet wheel engagement and non-engagement.

2. A pawl and ratchet gear transmission, comprising a driven shaft, a power driven pawl and ratchet wheel gear for driving said shaft, a cam in relation to the toothed periphery of the ratchet wheel regulatable for pawl movement and sustention in relief of the toothed periphery of the ratchet wheel for a portion and a full ratchet wheel engaging stroke for a rotative and non-rotative control of the ratchet wheel and a manually operabe pawl and ratchet wheel gear having a rotative crank in coupling connection with said cam to shift the same in alternate directions and step degrees for pawl ratchet wheel engagement and non-engagement.

3. A pawl and ratchet gear transmission, comprising a driven shaft, a pawl and ratchet wheel gear for driving said shaft, a cam in relation to the toothed periphery of the ratchet wheel regulatable for pawl movement and sustension in relief of the toothed periphery of the ratchet wheel for a portion and a full ratchet wheel engaging stroke for a rotative and non-rotative control of the ratchet wheel, a pawl and ratchet wheel gear having a rotative crank in coupling connection with said cam to shift the cam in step degrees and in alternate directions in a rotative cycle of its crank and a draft element extending from said second pawl and ratchet wheel gear for manually operating the same at a point remote therefrom.

EROS VALENTINE BARKER.

REFERENCES CITED

The following references are of record in the file of this patent:

UNITED STATES PATENTS

| Number | Name | Date |
| --- | --- | --- |
| 223,928 | Lambkin | Jan. 27, 1880 |
| 883,958 | Houseman | Apr. 7, 1908 |
| 885,908 | Buswell | Apr. 28, 1908 |
| 2,407,104 | Schmied | Sept. 3, 1946 |